(No Model.)

F. D. SPALDING.
CAR PLATFORM.

No. 354,443. Patented Dec. 14, 1886.

WITNESSES:
J. C. Hills,
Wm. S. Duvall

INVENTOR
Frank D. Spalding
BY
Baker & Donlin
ATTORNEYS.

UNITED STATES PATENT OFFICE.

FRANK D. SPALDING, OF CHICAGO, ASSIGNOR OF ONE-HALF TO WILLIAM L. BAKER, OF COOK COUNTY, ILLINOIS.

CAR-PLATFORM.

SPECIFICATION forming part of Letters Patent No. 354,443, dated December 14, 1886.

Application filed April 15, 1886. Serial No. 199,007. (No model.)

*To all whom it may concern:*

Be it known that I, FRANK D. SPALDING, a citizen of the United States, residing in the city of Chicago, county of Cook, and State of Illinois, have invented certain new and useful Improvements in Car Steps or Platforms, of which the following is a full, clear, concise, and exact description, reference being had to the accompanying drawings, forming a part of this specification, sufficient to enable others skilled in the art to make and use the same.

My invention relates to improvements in car steps or platforms, my object being to provide a supplemental movable step to be attached to the stationary step, which may be lowered at points along the road for the purpose of taking on or letting off passengers where there are no station-platforms, or where needed, and afterward raised out of position; and to these ends my invention consists in certain features of construction, hereinafter described, and particularly pointed out in the claim.

Figure 1:
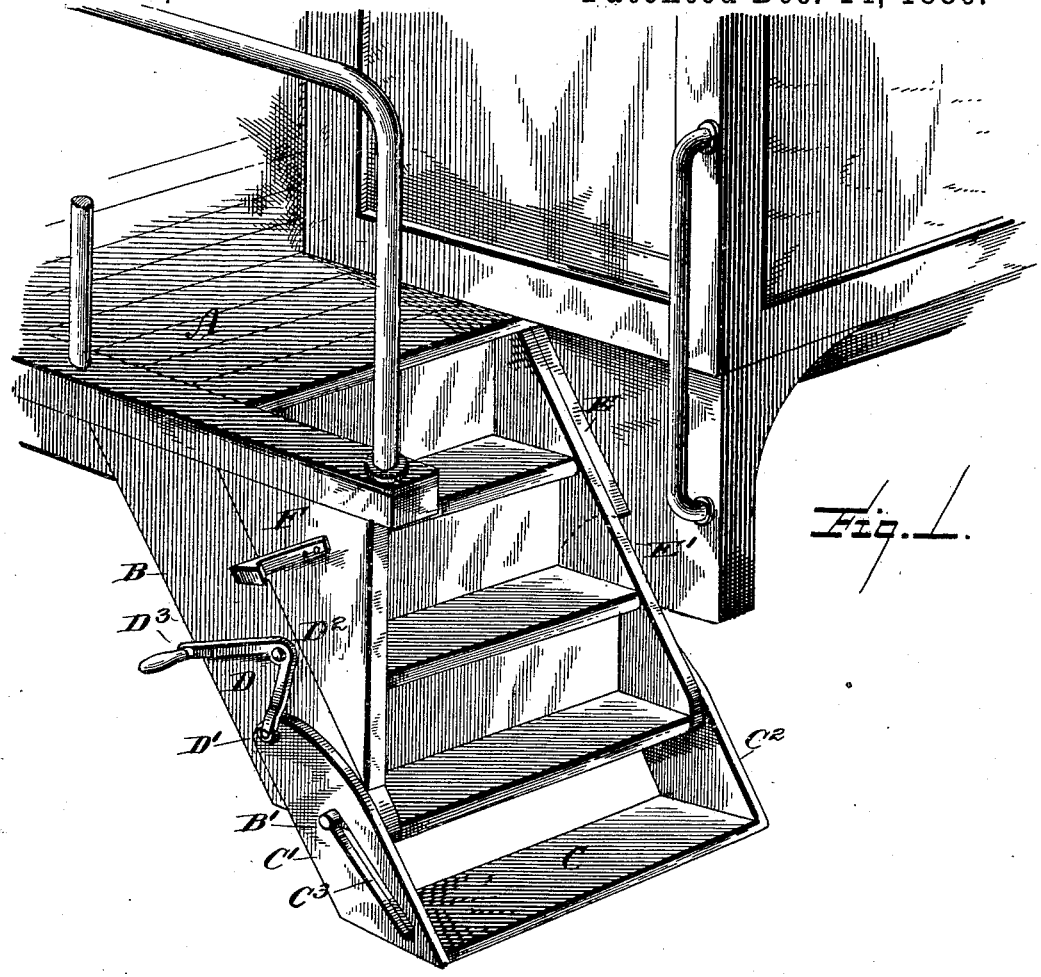
Figure 2:
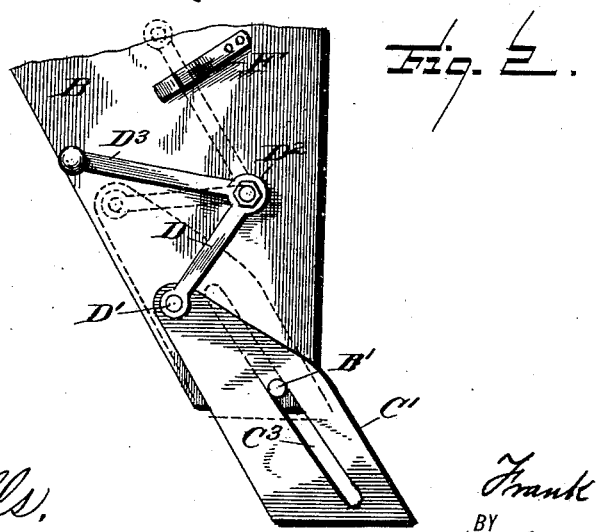

Referring to the drawings, Figure 1 is a perspective of the end of a car provided with my improved step. Fig. 2 is a detail in side elevation of the same, parts being broken away.

Like letters indicate like parts in both the figures of the drawings.

A represents the platform of a car, arranged at the sides of which are the usual stationary steps, B.

C represents my supplemental step, which may be made of metal or wood, as desired, and is provided with the side pieces $C'$ $C^2$, which are provided with an inclined slot, $C^3$. The step C is made sufficiently wide to embrace the stationary step B, the sides of which are provided with a lug or stop, $B'$, adapted to ride in the slot $C^3$ of the step C. If desired, the stop may be formed with a friction-roller to facilitate an easy working of the step. At the upper end of the side piece $C'$, as at $D'$, is secured one extremity of a bell-crank lever, D, the fulcrum of which is on a pivot bar or rod, $D^2$, which may be extended beneath the stationary step, and operates to raise and lower the opposite side piece $C^2$, if desired, or it may be a lug, $D^2$, and the other extremity of the lever is provided with a suitable operating-handle, $D^3$. If desired, the bell-crank lever may be extended or provided with a handle extending up to the platform of the car, whereby the step may be operated without the necessity of the operator leaving the same.

Between the inner side of the stationary step B and the end of the car I insert a space-block, E, when necessary, which extends down a short distance and forms a pocket or recess, $E'$, for the reception of the side piece $C^2$ of the step C. At a suitable point above the fulcrum of the lever, and secured to the side of the steps of the car, I provide a spring-catch, F, which may be of any desired formation, the object being to receive and retain the handle $D^3$ in an elevated position, thus retaining the step up, or out of operative position.

The operation of the invention will be readily perceived from the foregoing description. It is very often necessary for the car to stop for the purpose of taking on or letting off passengers at points along the road where no platform is provided, and as the stationary step of a car is a considerable distance above the road-bed the advantages and utility of my invention will be appreciated. By simply throwing down the lever D the step C will slide down, as shown in the drawings, the pin or lug $B'$ forming a stop, and after use the lever may be raised, the step drawn up, and held in a closed and locked position by means of the spring-catch F.

Having thus fully described my invention and its operation, what I claim is—

The combination, with the stationary step B, having the spring-catch F and space-block E, forming the pocket $E'$, of the movable or supplemental step C, having the side pieces $C'$ $C^2$, slotted, as at $C^3$, adapted to receive lugs $B'$, mounted in said stationary step, and with the bell-crank lever D, pivoted, as at $D'$ $D^2$, and provided with a handle, as $D^3$, substantially as shown and described.

FRANK D. SPALDING.

Witnesses:
 FREDERICK S. BAKER,
 WILLIAM L. BAKER.